Feb. 28, 1956 H. H. TURNER 2,736,410
MULTIPLE SHOE FRICTION CLUTCH
Filed Dec. 11, 1950 3 Sheets-Sheet 1

INVENTOR
Harold H. Turner
By Carlson, Pitzner, Hubbard & Wolfe
ATTORNEY

Feb. 28, 1956 H. H. TURNER 2,736,410
MULTIPLE SHOE FRICTION CLUTCH
Filed Dec. 11, 1950 3 Sheets-Sheet 2
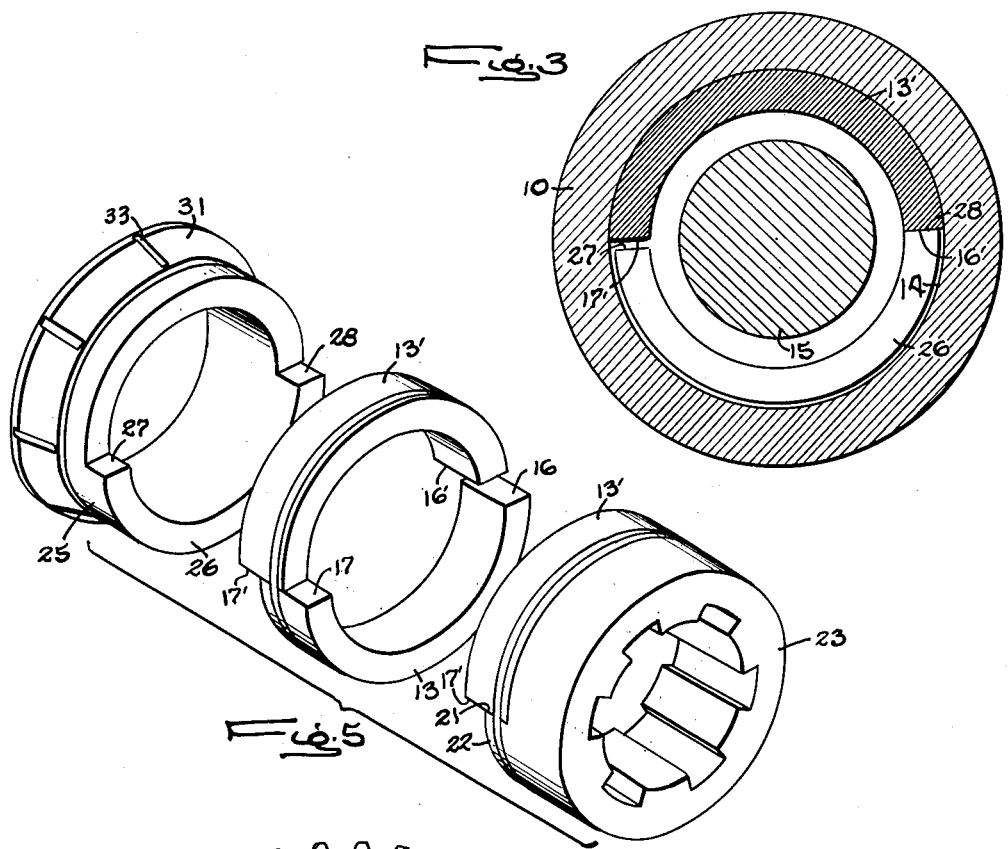
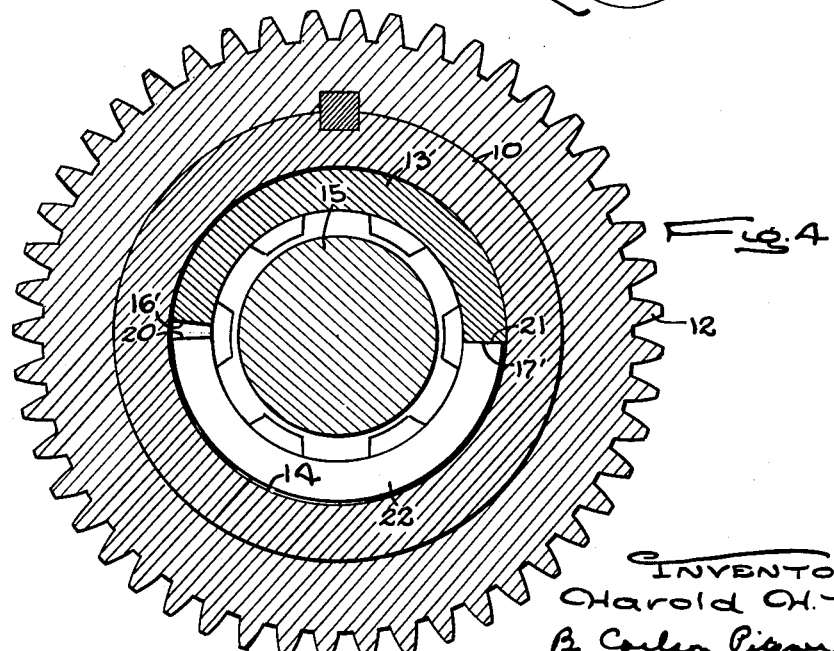
INVENTOR
Harold H. Turner
By Carlson, Pitzner, Hubbard & Wolfe
ATTORNEY Feb. 28, 1956  H. H. TURNER  2,736,410
MULTIPLE SHOE FRICTION CLUTCH
Filed Dec. 11, 1950  3 Sheets-Sheet 3
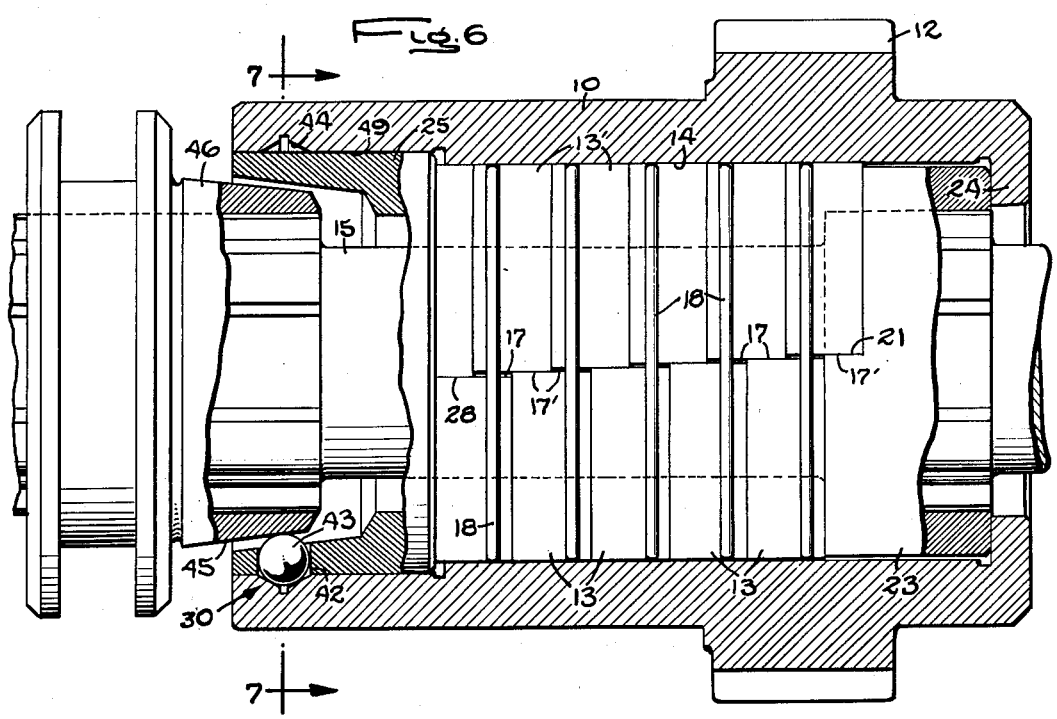
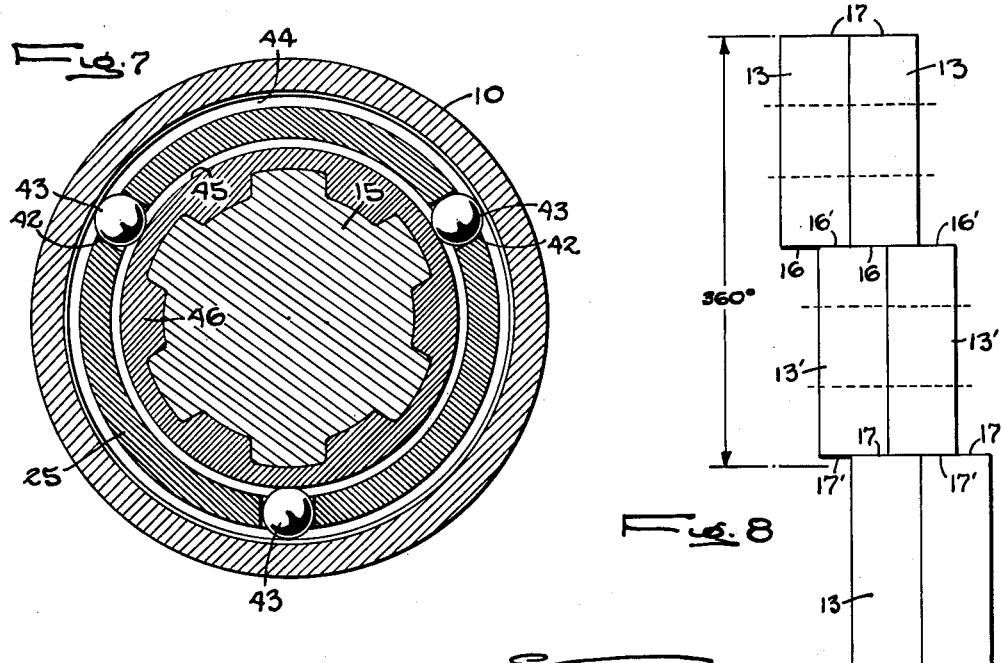
INVENTOR
Harold H. Turner
By Carlson, Pilger, Hubbard & Wolfe
ATTORNEY

United States Patent Office 2,736,410
Patented Feb. 28, 1956

2,736,410

MULTIPLE SHOE FRICTION CLUTCH

Harold Horton Turner, Rockford, Ill., assignor to The Ingersoll Milling Machine Company, Rockford, Ill., a corporation of Illinois Application December 11, 1950, Serial No. 200,255

11 Claims. (Cl. 192—35)

This invention relates to friction clutches of the type in which a plurality of arcuate shoes are arranged end to end in a spiral series around the internal surface of a driving drum with one terminal shoe of the series connected to the shaft to be driven.

One object is to construct and arrange the shoes in a novel manner which permits the shoes to be made as flat ring sectors and of uniform cross-sectional shape throughout their lengths.

A more detailed object is to employ substantially semicircular flat shoes arranged in two sets respectively disposed in diametrically opposite halves of the drum surface and axially staggered for abutting engagement of each shoe with two adjacent shoes of the other set.

Another object is to adapt the clutch for reverse operation.

A further object is to energize the clutch by a pilot clutch arranged and acting on the main clutch in a novel manner.

Other objects and advantages of the invention will become apparent from the following detailed description taken in connection with the accompanying drawings, in which.

Figure 1:
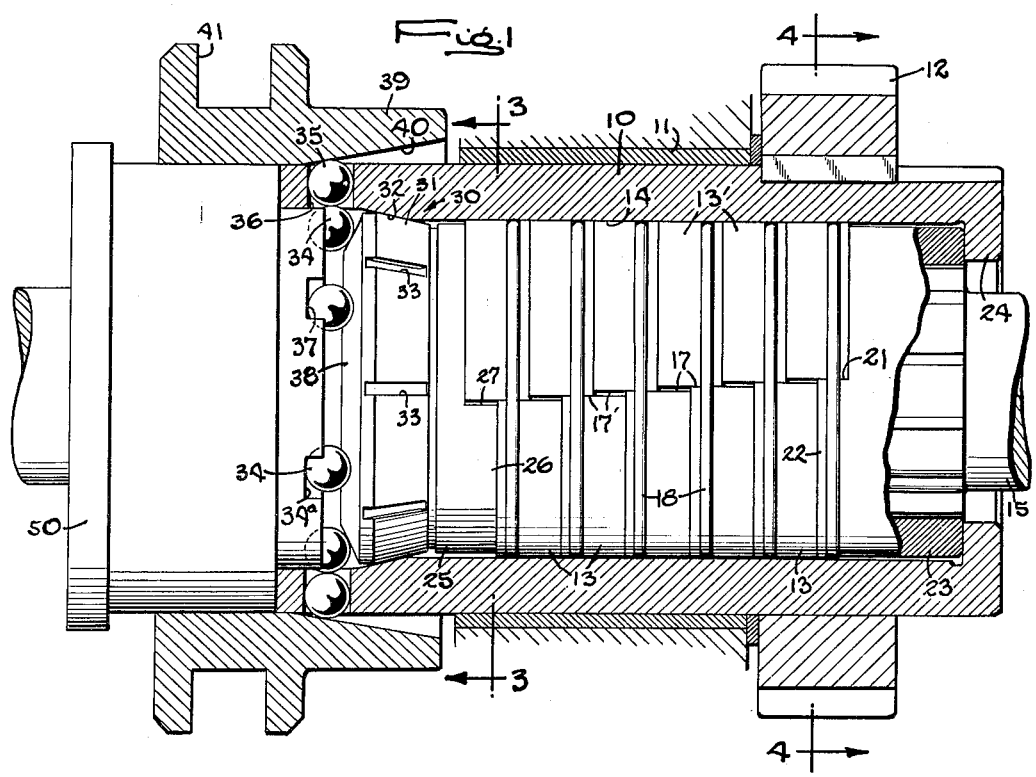
Figure 1 is a fragmentary diametrical sectional view of a clutch embodying the novel features of the present invention, the driven clutch element being shown in elevation and the parts of the clutch being engaged.

Figs. 3 and 4 are sections taken respectively along the lines 3—3 and 4—4 of Fig. 1.

Fig. 5 is an exploded perspective view of certain of the driven clutch parts.

Fig. 6 is a view similar to Fig. 1 showing a modification.

Fig. 7 is a section taken along the line 7—7 of Fig. 6.

Fig. 8 is a fragmentary development view of three of the clutch shoes.

In the forms shown in the drawings for purposes of illustration, the driving element of the improved friction clutch comprises a drum or sleeve 10 journaled in a suitable bearing 11 and adapted to be driven through a gear 12 rigid with the sleeve. The driven element clutch comprises a plurality of rigid arcuate shoes 13 and 13' preferably composed of metal such as steel and adapted for radial expansion into gripping engagement with the internal cylindrical surface 14 of the drum in response to a circumferentially directed actuating force applied to one shoe. To this end, the shoes are arranged end to end in a spiral series around a driven shaft 15 which extends axially through the drum and is journaled in suitable external bearings (not shown).

In accordance with the present invention, the shoes 13, which may be composed of one or more parts, are made of an arcuate length such that they may be formed as simple flat ring sectors of uniform cross section throughout their lengths. Herein, each shoe is substantially semicircular being slightly less than 180 degrees in arcuate length so that it may be formed readily by cutting a rigid ring of the desired cross section into two parts along a diameter of the ring. Half of the shoes, indicated at 13, are disposed side by side on one side of the drum with all of their square ends 16 and 17 lying adjacent a diametrical plane of the drum (see Fig. 2). In a similar way, the remaining shoes, indicated at 13', are arranged side by side along the other half portion of the drum surface with their ends 16' and 17' lying adjacent and facing toward the diametrical plane above referred to. The shoes of the set 13' are, however, offset axially relative to the shoes 13 a distance equal to substantially one half the width of the shoes so that the end surface 16' of one shoe 13' overlaps about half of the end surface 16 of the adjacent shoes 13 (see Fig. 8), the overlapping portions of the end surfaces being adapted for abutting engagement but free to shift relative to each other radially. For the same reason, the surface 17' at the opposite end of the shoe 13' overlaps and is adapted for abutting engagement with half of the area of the end 17 of the shoe 13 which lies alongside the first mentioned shoe 13. That is to say, except in the case of the terminal shoes of each set 13 and 13', opposite ends of a shoe of one set overlap and are engageable with ends of two adjacent shoes of the other set, an arrangement which, it will be observed, is made possible by employing semicircular shoes. There is, therefore, no necessity for notching end portions of the shoes or overlapping such portions as has been the practice heretofore in clutches of the present type.

Means is provided for urging the shoes radially inwardly to overcome centrifugal forces acting on the shoes so as to effect proper release of the clutch when the actuating force is relieved. This means, as shown herein, comprises a series of coil spring annuli 18 each contracted into alined grooves 19 extending around the periphery of two of the shoes, one in each of the two sets 13 and 13'. Proper alinement of the grooves in the assembly as described above is achieved as shown in Figs. 2 and 3 by axially offsetting the groove in each shoe from the center plane of the latter.

With the shoes offset axially as above described, the ends 16', 17' of one terminal shoe 13' at one end of the helical series will be exposed for engagement selectively with adjacent abutments 20 and 21 rigid with the driven shaft. Herein, these abutments are formed on the projecting semicircular sector 22 of a ring 23 splined onto the driven shaft 15 and disposed adjacent an inturned flange 24 on the drive sleeve 10 with the sector 22 lying alongside the first shoe of the set 13. The terminal shoe is thus engageable with either of the abutments 20 or 21 depending on the direction of rotation of the drive sleeve at the time of its engagement by the clutch shoes. In either case, the terminal shoe is coupled positively to the driven shaft.

In the present instance there are six of the shoes 13' and five in the set 13 so that the ends 16' and 17' of the other terminal shoe 13' are exposed at the other end of the spiral series. Provision is made for applying a circumferentially directed actuating force to one of these shoe ends and thus initiate the expanding action of the driven clutch elements or shoes. For this purpose, a collar 25 encircles and is loose on the driven shaft 15 and is formed with a projecting semicircular sector 26 which lies alongside the terminal shoe of the set 13 and has ends 27 and 28 disposed adjacent and engageable with the exposed ends 17' and 16' of the terminal shoe 13'.

As the actuating collar is turned in either direction when the shoes 13 and 13' are contracted away from the drum and the clutch is thus released, the corresponding abutments 27 or 28 engage one end of the first shoe 13' thus shifting the same circumferentially and at the same time bringing the shoe periphery against the drum surface. This initiates a servo action which supplements the initial actuating force, the combined force being applied to the first shoe 13 which is the second one in the helical series. This action progresses through the successive shoes of the entire series so that all of the shoes are expanded into gripping engagement with the drum, each acting to build up and augment the actuating torque applied to the succeeding shoe. As a result, a powerful total torque is derived frictionally and applied to one of the abutments 20 or 21 and therefore is exerted on the drive shaft. When the actuating force applied by the ring 25 is relieved, the centrifugal forces on the shoes are overcome by the springs 18 and the shoes are drawn inwardly out of engagement with the drum. The clutch is thus released.

Figure 2:
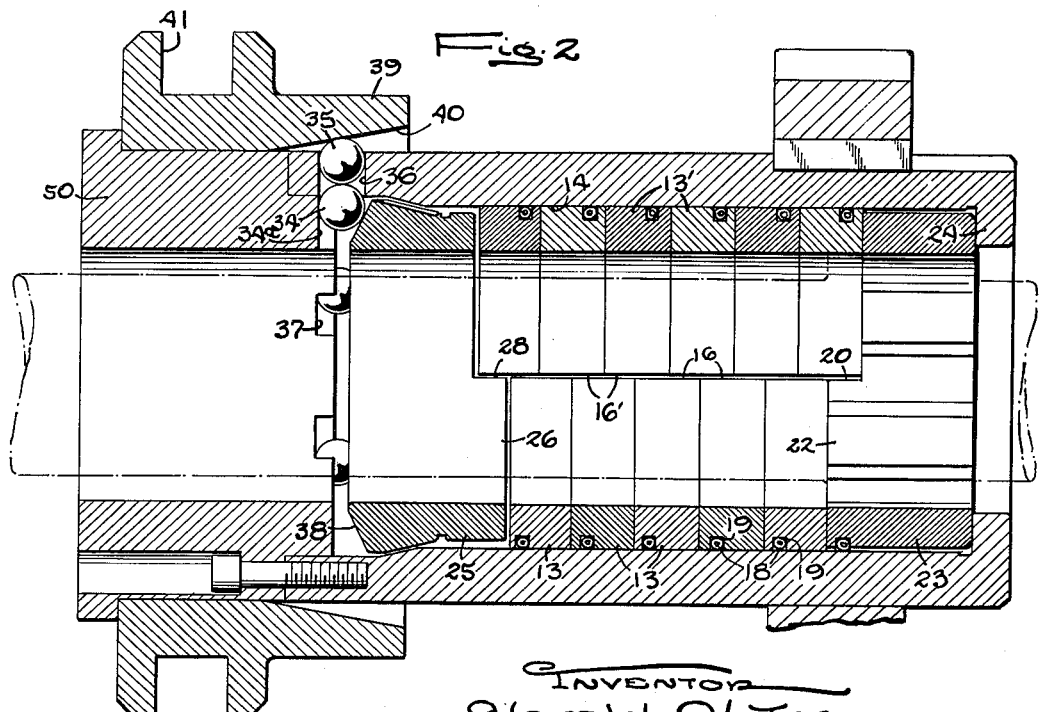
Fig. 2 is a fragmentary diametrical sectional view of the improved clutch with the parts in released positions.

The initial actuating force may, as shown, be derived from the motion of the driven shaft, this being accomplished through a pilot clutch 30. In the form shown in Figs. 1 and 2, this clutch is of the coned friction type comprising frustoconical driving and driven surfaces 31 and 32 formed respectively on the interior of the sleeve 10 and the exterior of the ring 25. Grooves 33 formed in the surface 32 at spaced points around the latter operate to break any oil film tending to form between the surfaces which are moved into and out of gripping engagement as shown in Figs. 1 and 2 respectively by shifting the ring 25 axially in opposite directions. This may be accomplished by pairs of balls 34 and 35 disposed in radially opening recesses 36 which are formed in the drive sleeve 10 at points angularly spaced therearound. The inner balls 34 are disposed in angularly spaced notches 34ª in an annulus 50 bolted to the end of the drive sleeve, and each ball bears on one side against a radially disposed wall 37 on the annulus 50 and on the other side engages an inclined surface 38 on the outer end of the ring 25. A collar 39 loosely surrounding the sleeve 10 is formed with a conical cam surface 40 which, as the collar is shifted to the right as viewed in Fig. 1, cams the balls 34 and 35 inwardly and the ball 35, acting as a cam on the surface 38, wedges the ring 25 axially to engage the pilot clutch and initiate the energization of the main clutch. The collar 39 may be shifted by any suitable means such as a manually actuated yoke (not shown) engaging the collar within a groove 41.

Where an actuating force of greater magnitude is desired, a pilot mechanism of the character shown in Fig. 6 may be employed. In this, the actuating ring 25 is loosely journaled at 49 in the end portion of the drive sleeve 10 and near its outer end is formed with holes 42 which receive balls 43. The latter are seated on their outer sides in a shallow coned groove or track 44 in the internal wall of the drive sleeve 10. On their inner side, the balls bear against the gradually tapered periphery 45 of a collar 46 which is splined to and axially slidable along the outwardly projecting end of the driven shaft 15. When the collar is shifted to the right as viewed in Fig. 6, the balls 43 become wedged between the track 44 and the surface 45. Since the track 44 moves with the driving sleeve, the balls thus wedged against the surface 45 must roll around the latter thus moving the ring 25 angularly to apply the main clutch. In this action, the balls act frictionally much like the planet gears of a differential as a result of which the actuating force derived from the motion of the drive sleeve is applied to the ring 25 at a greatly increased mechanical advantage.

If desired, the single piece shoes 13 and 13' may be divided along the dotted lines shown in Fig. 8 and thus composed of a plurality of parts. In such a case, all of such parts of each shoe would remain in a common plane with the entire areas of the ends of adjacent parts in full abutment with each other as contrasted with the axial offsetting of the adjacent shoes 13 and 13' whose ends overlap over only one-half of their areas.

In the improved clutch as described above, it will be observed that the full arcuate length of each of the shoes 13 and 13' comes into gripping engagement with the drum surface and contributes to the building up of a powerful self-energizing effect and a resultant torque of corresponding magnitude. Owing to the rigid metal construction of the shoes the self-energizing action is readily controllable and the clutching elements are adapted to operate in oil. The shoe arrangement provides for optimum torque transmitting capacity for a given overall size of the clutch since the peripheral surfaces of the shoes cover the entire area of the drum surface. The shoes are of very simple construction and may be manufactured at a low cost. Moreover, the shoes of each diametrically opposed set and the associated driven and actuating rings 23 and 25 lie close together and alongside each other so that each shoe is guided accurately in its radial and circumferential movements.

I claim as my invention:

1. A friction clutch comprising a rotary driving drum, a set of rigid semicircular flat ring sectors disposed side by side within said drum on one side thereof, each of said sectors having a uniform cross section throughout its length, a second set of similar sectors disposed side by side within and on the other side of said drum and offset axially so that one end of each sector in one set partially overlaps and is engageable with the adjacent end of two adjacent sectors of the other set so as to interconnect all of the sectors in a helically extending series and leave both ends of the terminal sector at opposite ends of the series partially exposed, springs urging said sectors radially inwardly, a rotary driven element having two oppositely facing radially disposed abutments thereon disposed adjacent and engageable with the respective ends on one of said terminal sectors, a rotary member having two oppositely facing radially disposed abutments thereon disposed adjacent and engageable with the respective ends on the other of said terminal sectors, and means by which an actuating torque may be applied to said rotary member.

2. A friction clutch comprising a rotary driving drum, a set of rigid semicircular flat ring sectors disposed side by side within said drum on one side thereof, a second set of similar sectors disposed side by side within and on the other side of said drum and offset axially through a distance less than the width of the sectors whereby to interconnect the sectors of the two sets end to end in alternating relation, each of said sectors having an outwardly opening groove in its periphery surface offset axially from the center of the sectors and alined with the groove in the sector of the other set, springs encircling and seated in the matching grooves of two of said sectors and urging the latter toward each other, in opposition to the centrifugal forces acting thereon, a rotary driven element having a radially disposed abutment thereon disposed adjacent and engageable with an end on one of the terminal sectors of said series, a rotary member having a radially disposed abutment thereon disposed adjacent and engageable with an end on the other terminal sector, and means by which an actuating torque may be applied to said member.

3. A friction clutch comprising a rotary driving drum, a set of rigid semicircular flat ring sectors each of uniform cross section throughout its length, said sectors being disposed side by side within said drum on one side thereof, a second set of similar sectors disposed side by side within and on the other side of said drum and offset axially through a distance less than the width of the sectors whereby to interconnect the sectors of the two sets end to end in alternating relation, springs urging said sectors radially inwardly, a rotary driven element having a radially disposed abutment thereon disposed adjacent and engageable with an end on one of the terminal sectors of said series, a rotary member having a radially disposed abutment thereon disposed adjacent and engageable with an end on the other terminal sector, and means by which an actuating torque may be applied to said member.

4. A friction clutch comprising a set of rigid shoes each comprising a semicircular flat ring sector of uniform cross section throughout its lengths and having squared ends, said sectors being disposed side by side with their ends lying approximately in a common plane, a second set of similar shoes disposed side by side with their ends facing toward and opposed to the ends of said first shoes and offset axially relative to the latter for abutting engagement of the ends of one shoe with either end of two adjacent shoes of the other set whereby to interconnect the shoes in a helically extending series and leave the ends of the terminal shoe of the series partially exposed, a plurality of springs axially spaced along said series and urging all of the shoes radially and inwardly, a rotary driven element having two oppositely facing radially disposed abutments thereon disposed adjacent and engageable with the respective ends on one of said terminal shoes, and a rotary actuating member having a radially disposed abutment thereon disposed adjacent and engageable with the end on the other of said terminal shoes.

5. A friction clutch comprising a set of rigid shoes each comprising a semicircular flat ring sector of uniform cross section throughout its lengths and having squared ends, said sectors being disposed side by side with their ends lying approximately in a common plane, a second set of similar shoes disposed side by side with their ends facing toward and opposed to the ends of said first shoes and offset axially relative to the latter for abutting engagement of the ends of one shoe with either end of two adjacent shoes of the other set whereby to interconnect the shoes in a helically extending series and leave the ends of the terminal shoe of the series partially exposed, a rotary driven element having two oppositely facing radially disposed abutments thereon disposed adjacent and engageable with the respective ends on one of said terminal shoes, a rotary actuating member having a radially disposed abutment thereon disposed adjacent and engageable with the end on the other of said terminal shoes, and springs urging said shoes radially inwardly.

6. A friction clutch comprising a rotary driving drum, a plurality of rigid and flat arcuate sectors of uniform cross section shape throughout their lengths arranged end to end in a spiral series around the interior of said drum and adapted for radial movement into gripping engagement therewith, each of said sectors having an arcuate length of approximately 180 degrees and being offset axially relative to the sector engaged thereby, means yieldably urging said sectors radially inwardly, a driven element having an abutment thereon engageable with one terminal sector of said series, a rotary member having an abutment disposed opposite and engageable with an end on the other terminal sectors of said series, and means by which a rotary torque may be applied to said member.

7. A friction clutch comprising a rotary driving drum, a set of rigid semicircular flat ring sectors disposed side by side within said drum on one side thereof, each sector having a uniform cross section throughout its length, a second set of similar sectors disposed side by side within and on the other side of said drum and offset axially so that one end of each sector in one side partially overlaps and is engageable with the adjacent end of a sector of the other set so as to interconnect the sectors in a helically extending series, each of said sectors being engageable with the internal surface of said drum, means yieldingly urging said sectors radially inwardly, a driven member having a circumferentially facing abutment engageable with one terminal end of said sector series, and a pilot clutch adapted when energized to derive torque from the rotation of the drum and apply the same to the other terminal end of said sector series.

8. A friction clutch comprising a rotary driving sleeve, a rotary driven element at one end of said sleeve having a circumferentially facing abutment rigid therewith, a pilot friction clutch including a member disposed at the opposite end of said sleeve and axially shiftable to bring the clutch surfaces into and out of axial gripping engagement, said surfaces being formed respectively on said sleeve and said member, a plurality of rigid semicircular ring sectors of uniform cross section throughout their lengths arranged serially in end to end relation around the internal surface of said sleeve and staggered axially with the adjacent ends of adjacent sectors overlapping and abutting against each other and with the leading end of one terminal sector engaging said abutment, springs urging said sectors radially inwardly, and a circumferentially facing abutment on said member engaging the trailing end of the other terminal ring sector.

9. A friction clutch comprising a rotary driving drum, a set of rigid semicircular shoes disposed side by side within said drum on one side thereof with their ends disposed adjacent a diametrical plane of the drum, each of said sectors having a uniform cross section throughout its length, a second set of similar shoes disposed side by side within and on the other side of said drum and offset axially a distance less than the width of said first shoes so that each end of a shoe of one set overlaps and is engageable with the adjacent end of a shoe of the other set, means yieldably urging said sectors radially inwardly, a driven member coupled to one terminal shoe of the series, and a rotary actuating element for applying an actuating torque to the other terminal shoe of the series.

10. A friction clutch comprising a rotary driving drum, a plurality of rigid arcuate shoes arranged end to end in a helical series within said drum and movable into gripping engagement with the interior of the drum, means yieldably urging said shoes radially inwardly, a driven shaft extending axially through said drum and connected to one terminal shoe of said series, a pilot friction clutch adapted when energized to derive torque from the rotation of the drum and apply the same to the other terminal shoe of said series, said clutch including an axially movable member having a conical surface thereon, a collar shiftable axially of said drum and having an internal conical surface concentric with said first surface, and a plurality of angularly spaced follower elements movable radially inwardly and outwardly in response to shifting of said collar in opposite directions, said follower elements engaging said other conical surface and acting thereon to cam said member axially.

11. A friction clutch comprising a rotary driving drum, a plurality of rigid arcuate shoes arranged end to end in a helical series within said drum and movable into gripping engagement with the interior of the drum, means yieldably urging said shoes radially inwardly, a driven shaft extending axially through said drum and connected to one terminal shoe of said series, a hollow actuating member coupled to the other terminal shoe of said series and having an annular series of inwardly and outwardly radially disposed holes therein, an inwardly opening groove around the interior of said drum matching with said holes, an axially movable ring having an axially tapering surface projecting into said member beyond said holes, and balls of greater diameter than the depth of said holes each rotatably held in one of the holes with one side seated in said groove and the other bearing against said tapered surface.

References Cited in the file of this patent

UNITED STATES PATENTS

| | | |
|---|---|---|
| 2,044,420 | Collyear | June 16, 1936 |
| 2,255,671 | Loehr | Sept. 9, 1941 |